United States Patent
Nierop et al.

(10) Patent No.: US 8,935,450 B2
(45) Date of Patent: Jan. 13, 2015

(54) NETWORK COMMUNICATIONS CIRCUIT, SYSTEM AND METHOD

(75) Inventors: Pieter Gustaaf Nierop, Nijmegen (NL); Clemens Gerhardus Johannes de Haas, Ewijk (NL); Rainer Evers, Hamburg (DE); Franciscus Johannes Klosters, Schaijk (NL)

(73) Assignee: NXP B.V., Eindhoven (NL)

( * ) Notice: Subject to any disclaimer, the term of this patent is extended or adjusted under 35 U.S.C. 154(b) by 556 days.

(21) Appl. No.: 13/234,798

(22) Filed: Sep. 16, 2011

(65) Prior Publication Data

US 2013/0073761 A1    Mar. 21, 2013

(51) Int. Cl.
  *G06F 3/00* (2006.01)
  *G06F 13/00* (2006.01)
  *H04L 12/40* (2006.01)
(52) U.S. Cl.
  CPC . *H04L 12/40045* (2013.01); *H04L 2012/40234* (2013.01)
  USPC .............................................. 710/110; 710/9
(58) Field of Classification Search
  CPC . G06F 13/364; G06F 13/4291; H04L 12/403; H04L 12/40; H04L 29/12207; H04L 29/12254
  USPC ..................................................... 710/9, 110
  See application file for complete search history.

(56) References Cited

U.S. PATENT DOCUMENTS

| | | | |
|---|---|---|---|
| 5,938,742 A * | 8/1999 | Faddell et al. | 710/9 |
| 7,091,876 B2 | 8/2006 | Steger | |
| 7,328,286 B2 | 2/2008 | Vinnemann | |
| 7,937,516 B2 | 5/2011 | Muth | |
| 8,250,269 B2 * | 8/2012 | Hsieh | 710/104 |
| 8,543,740 B2 * | 9/2013 | Lotzenburger et al. | 710/9 |
| 8,620,394 B2 | 12/2013 | Sebastiano et al. | |
| 8,629,581 B2 * | 1/2014 | Rutkowski et al. | 307/125 |
| 2008/0177919 A1 * | 7/2008 | Miyazawa | 710/110 |
| 2009/0144471 A1 * | 6/2009 | Lin | 710/110 |
| 2010/0185784 A1 * | 7/2010 | De Nie et al. | 710/9 |
| 2010/0314950 A1 | 12/2010 | Rutkowski et al. | |
| 2013/0057339 A1 * | 3/2013 | Koudar | 327/565 |

FOREIGN PATENT DOCUMENTS

WO    2009044368 A2    4/2009

OTHER PUBLICATIONS http://en.wikipedia.org/wiki/Local_Interconnect_Network.

* cited by examiner

*Primary Examiner* — Brian Misiura

(57) ABSTRACT

Various exemplary aspects are directed to apparatuses and methods involving switches communicatively-coupled on a bus where one or more of the switches operate to block signals from passing through the switch in a first mode, and to pass signals through the switch in a second mode. A logic circuit is responsive to addressing information received in the first mode, by storing and configuring the apparatus with the address information. The logic circuit ignores address information received in the second mode (e.g., does not reconfigure the apparatus with address information received in the second mode).

20 Claims, 6 Drawing Sheets

NETWORK COMMUNICATIONS CIRCUIT, SYSTEM AND METHOD

A variety of network-based communications are used in different systems and environments. For example, industrial, automotive and other industries have used network-based communications to facilitate the control of devices and/or communication between nodes. These communications have been increasingly used, to suit various needs. In particular, the automotive industry has seen increased use of network communications for a variety of uses, such as for controlling nodes relating to the operation of a vehicle.

One type of communication network that is being increasingly used in vehicles is the LIN (for local interconnect network). A LIN includes a master and a number of slaves, in which the master controls the LIN during communication. Such a network can be implemented with other networks, such as the CAN (controller-area network), in a hierarchical arrangement.

In many applications, UART (Universal Asynchronous Receiver Transmitter) controllers have been used to carry out LIN protocol functions, which stipulate the behavior of a master and of slaves during data transmission. A related protocol uses data blocks having 8 data bits preceded by a start bit and followed by a stop bit, which is useful for a variety of applications.

In many applications, implementations of the LIN protocol involve more detailed communications. In addition, various applications benefit from the comparison of transmitted data with data received from a data bus, or from the calculation and checking of checksums. These aspects often require additional functionality to implement. For example, certain applications require complex protocols and complex circuitry (e.g., additional communications circuits/pins), which can be susceptible to failure and more expensive.

These and other issues continue to present challenges to the implementation of circuits in a variety of applications, and in particular to addressing challenges in a master-slave type of network such as a LIN.

Various example embodiments are directed to circuits, networks, systems and approaches that addressing challenges including those discussed above.

In accordance with one or more example embodiments, a system includes a master circuit and a plurality of slave circuits communicatively coupled in a cascaded arrangement via a current-carrying bus. Each of the slave circuits includes a switch that is responsive to a control signal received over the bus by interrupting and thereby blocking current from passing to another one of the slave circuits that is immediately adjacent in the cascaded arrangement.

Another example embodiment is directed to a switching circuit including a control circuit and a switch having a gate, a source and a drain. The control circuit is connected to the gate and applies a bias to the gate to control a conductance state of the switch. In response to receiving a configuration signal, the control circuit operates in a first mode to control the switch in an open state to block signals from passing through the switch. In a second mode (i.e., when a slave circuit served by the switching circuit has already been addressed), the control circuit controls the switch in a closed state to pass signals through the switch. A logic circuit responds to address information received in a signal presented at the source by, in the first mode, storing the address information to configure the apparatus with the address. In the second mode, the logic circuit responds by ignoring address information in signals presented at the source.

Another example embodiment is directed to a communication system including a master circuit and a plurality of slave circuits. The master circuit is located at a master node and communicates a configuration signal and address signals on a communications bus. The slave circuits are located at slave nodes on the bus, and each slave circuit includes a switch that couples the slave circuit to an immediately adjacent slave circuit on the bus. Each slave circuit responds to the configuration signal by, in a first mode, controlling the switch in an open state to block the address signal (e.g., a LIN message) from passing to the immediately adjacent slave circuit on the bus, storing address information from the address signal, and switching to a second mode after storing the address information. In the second mode, the slave circuit responds to the configuration signal by controlling the switch in a closed state to pass the address signal to the immediately adjacent slave circuit on the bus (e.g., when the slave circuit has already been assigned an address).

Another example embodiment is directed to a method for assigning addresses to a plurality of slave circuits connected to each other and to a master circuit in a cascaded arrangement on a bus. A first signal (e.g., a LIN message) is communicated from the master circuit and, at each slave circuit receiving the first signal, a switch is opened to block further communications from passing from the master circuit, through the switch and to another immediately adjacent slave circuit. At the master circuit, a second signal including address assignment data is communicated. At one of the slave circuits, in response to receiving the address assignment data, data indicative of an address in the address assignment data is stored and a switch is closed to pass further communications from the master circuit to an immediately adjacent slave circuit on the bus. This method may, for example, be implemented as an algorithm and carried out at the respective slave circuits, with corresponding communications carried out at the master circuit.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

Figure 1:
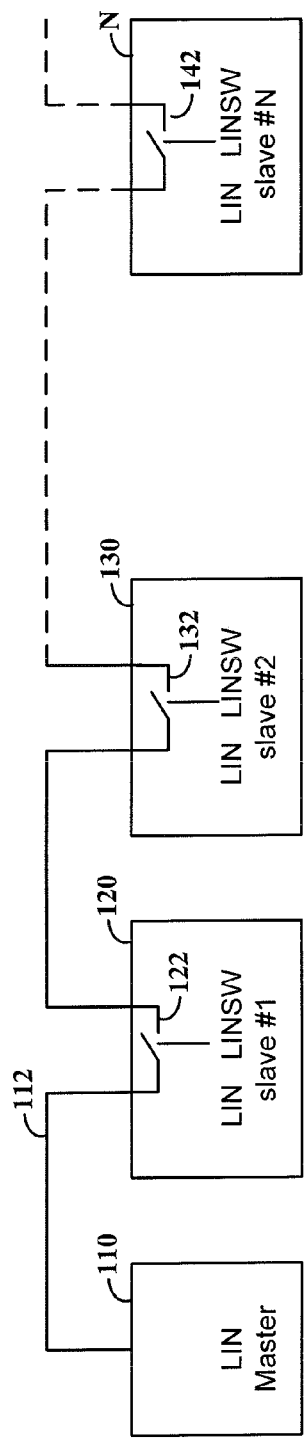
FIG. 1 shows a network system, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of circuits, devices and systems for and/or involving power controllers. While the present invention is not necessarily limited in this context, various aspects of the invention may be appreciated through a discussion of related examples.

In accordance with various example embodiments, an integrated switch is implemented in connection with a network node, to facilitate selective addressing of the network node. The switch includes a network switch for series connection with a plurality of network nodes. Such an approach may involve connecting a master node with a plurality of slave nodes in series, with the respective switches being operable for selectively connecting each node.

The respective switches at each slave node can thus cut off communications to further slave nodes when the slave node (effecting the cutoff) is being operated for node addressing. Current can be cut off in a single direction, with the signal emanating from the master node at an end of a series communications link between the respective nodes (e.g., where the drivers of the respective nodes employ a sinking current source). In addition, the node addressing communications can be limited to an operating range of the supply voltage (battery) of the device (e.g., between 7V and 18V), with node-addressing not needing to be functional below or above this voltage range.

The switches can be implemented using, for example, MOS-based transistors that pass a signal along a network to an additional node or node, based on a threshold voltage (e.g., activation of a communications bus on which the switch is connected). When the gate and source of a transistor is shortened, the transistor will not conduct anymore, so the switch is able to prevent the passing of a signal along the bus.

Various embodiments are directed toward an integrated switch that facilitates node address assignment in a network, by preventing the signal on the bus from passing to another slave node, while allowing the signal pass in a normal mode, with good EMI performance.

In various implementations, this approach is implemented for a LIN network with LIN node address assignment of LIN slaves (e.g., identical) that are connected on a LIN bus, such as an automotive LIN bus (e.g., in a vehicle), or another system bus such as a bus for manufacturing equipment, heating, ventilation and air conditioning (HVAC) type systems, and others. The implementation is an integrated series switch in each LIN slave to prevent passing data to successive LIN slaves in the event that the switch is "open" (in a non-conducting state), and to allow LIN communications between LIN-nodes (master and slaves) when the switch is "closed" (in a conducting state), even when the LIN-signal is interfered with by unwanted electro-magnetic signals, which may be large.

In various implementations, the LIN slaves as discussed above are identical, which can be challenging with respect to identifying the respective slaves, such as by assigning a node address to each slave, by a LIN master. Accordingly, each slave receives a unique node address (NAD) so that a single specified LIN slave can be addressed. During assembly of identical LIN slave modules, the LIN master needs to know which slave to assign an address to and the slave has to know whether it is its turn to be assigned an address. The master sends signals to the slaves in a node addressing mode, with the communication going in one direction, as implemented with a LIN-network having sinking current-drivers in combination with pull-up resistors for each node, with current flowing towards a master node at the end of a series of slave nodes when the master current driver is on (dominant). Addressing a single specified LIN slave as relative to other identical slaves is thus carried out, in accordance with one or more embodiments herein.

In some implementations, the switch includes two integrated NMOST and/or PMOST components connected in anti-series, so the switch can be in non-conducting mode (open) in both directions. In other implementations, the switch includes NMOST and PMOST components, connected in parallel, so the switch can be in conducting mode (closed) when the switch is close to the positive supply-voltage and when the switch is close to the negative supply-voltage.

In various contexts, the term "anti-series" as used in the context of connecting transistors is defined as interconnecting the respective terminals of transistors (as in sources or drains of FETs); for example, two transistors are connected to one another in anti-series when their respective sources/drains are connected to provide an effective short circuit as would be provided by interconnecting at a common node or by way of a negligible-impedance material or structure. Two FETs are not connected in anti-series when the source of one of the FETs is interconnected to the drain of the other one of the FETs, or when a circuit component is connected between the (source or drain) terminals of two FETs. Similarly, the term "anti-parallel" as used in the context of connecting diodes is defined as connecting diodes to common circuit nodes, in opposing directions (see, e.g., FIG. 3 with diodes 332 and 334 being in anti-parallel with diodes 336 and 338).

Another example embodiment is directed to a network address assignment system and approach, which includes a network master node and a plurality of network slave nodes, with each slave node being connected in series via a switching circuit as discussed herein. The switching circuits may be integrated with each slave node, and using a single additional pin that cuts the communication to successive slave nodes by a slave node assigned for node addressing. Such an application may be implemented with a LIN protocol and network, such as for automotive and/or industrial applications. For general information regarding LIN networks, and for specific information regarding aspects of LIN networks in which various example embodiments of the present invention may be implemented, reference may be made to the LIN Specification Version 2.2 (and earlier versions thereof), available from the LIN Consortium of Munich, Germany.

As discussed herein, the various switching circuits may be implemented using one or more of a variety of approaches and network systems. Referring to the figures, FIG. 1 shows one such network system 100, in accordance with another example embodiment of the present invention. The system 100 includes a LIN master circuit 110, and a plurality of LIN slave circuits including circuits 120, 130 and N, all connected in a series cascaded arrangement with the LIN master circuit via a current-carrying bus 112. Each of the slave circuits includes respective switches 122, 132, and 142, which may be implemented using switches as discussed herein. The LIN master circuit can be configured and arranged using many different circuits, subject to communication-protocol functionality/steps as appropriate for communication with the LIN slave circuits as discussed herein. As examples, the LIN master circuit can be chosen from any of a number of commercially-available parts as would be conventional for LIN-based bussing networks. See, for example, part numbers TJA1021, TJA1027, TJA1020, UJA1061 and UJA1078 (available from NXP Semiconductors USA) can be implemented with systems as described herein.

In some embodiments, the system 100 operates as follows. In a configuration mode in which addresses are to be assigned to one or more of the slave circuits 120 and 130-N, the master circuit 110 sends out a configuration signal on the bus 112. Each slave circuit receives the configuration signal and enters a configuration mode in which the respective slave circuits respond by operating their respective switches in an open condition if the slave circuit has not been assigned an address, and by operating their respective switches in a closed condition if the slave circuit has already been assigned an address. In this manner, each slave circuit is respectively addressed. This approach may be carried out, for example, using algorithms that are executed at the respective slave circuits and the master circuit, to effect the various communications, such as applicable to the method-based approaches discussed herein.

Referring to slave circuit 120 by way of example, if the slave circuit receives the configuration signal and has not yet been assigned an address, switch 122 is opened to block communications from the master circuit 110 from reaching slave circuit 130. The master circuit 110 then sends addressing data that is received by the slave circuit 120 and stored as the address thereof. The slave circuit 120 then closes switch 122, after which the master circuit can send address information to the immediately adjacent slave circuit 130. In some implementations, the master circuit re-sends the configuration signal after the slave circuit 120 sends an acknowledgement that it has received and stored address data, and in other implementations, the master circuit simply sends another set of addressing data for a net slave circuit, with the respective slave circuits remaining in a configuration mode until addressing is complete.

In some implementations, the system 100 includes one or more slave circuits connected to the bus 112 without a switch, such that the communications on the bus always pass the slave circuit, to other slave circuits. For example, slave circuit 130 may be implemented without a switch as shown, with a connection to the bus that permits signals to pass between slave circuit 120 and slave circuit N.

Figure 2:
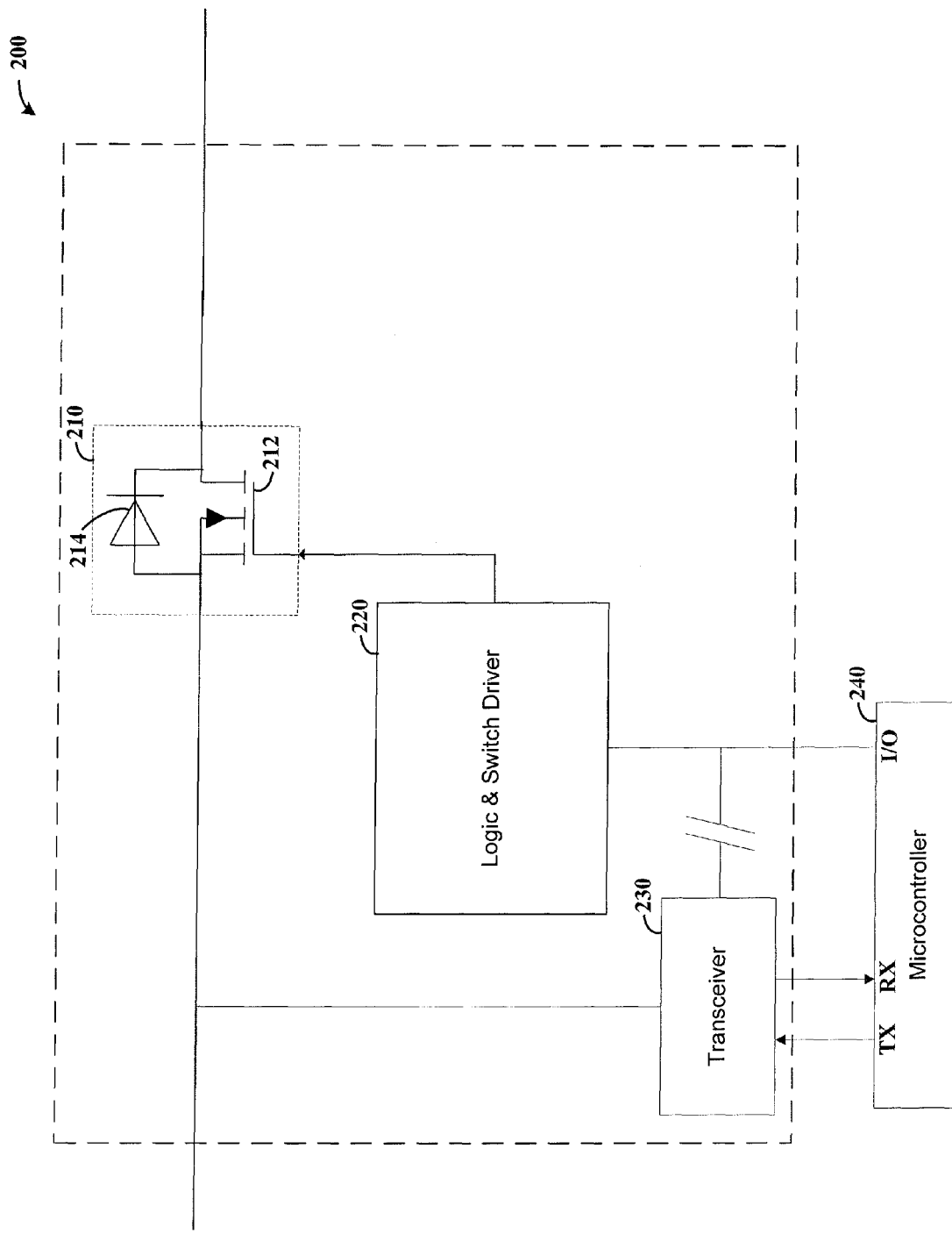
FIG. 2 shows a network switching circuit, in accordance with another example embodiment of the present invention.

FIG. 2 shows a network switching circuit 200, in accordance with an example embodiment of the present invention. The switching circuit 200 includes a LIN switch 210 controlled by a LIN switch driver 220. The switch 210 includes one or more PMOST or NMOST device, and is located in series on a bus in a LIN network. The driver 220 is responsive to communications signals received over the bus via a transceiver 230, such as for receiving configuration signals from a master circuit as described in connection with FIG. 1 above.

Accordingly, the driver 220 may operate with the transceiver 230 (and/or other logic circuits) as a controller for controlling the switch 210. In some implementations, the driver 220 is responsive to a microcontroller 240, which communicates via the transceiver 230 for receiving communication signals over the bus. The microcontroller 240 sends a control signal to the driver 220, such as shown in and described in connection with FIG. 6 below (e.g., via the LINOFF signal). Further, the driver 220 may differ depending on the use of PMOSTs or NMOSTs for the switch 210.

In some implementations, the switch 210 consists of two integrated NMOST and/or PMOST components both connected anti-series, so the switch can be in non-conducting mode (open) in both directions. In other implementations, the switch consists of NMOST and PMOST components, connected in parallel, and the switch is in a conducting mode (closed) when the switch is close to the positive supply-voltage and when the switch is close to the negative supply-voltage.

In other implementations, the switch 210 consists of one NMOST or PMOST component. Such an implementation can be used, for example, when the switch 210 has a non-conducting requirement in a single current direction, and a conducting requirement when the switch is close to one supply voltage. This approach can be implemented to save about 50% of a transistor area (e.g., relative to the use of more than one switching component).

For implementations in which the switch 210 does not have to function in off state when the battery voltage exceeds 18V, the switch is implemented as a MOST component that can handle a maximum of 20V drain-source voltage. A clamping device is connected in parallel to the MOST component, to handle current in the event that the battery voltage exceeds 18V, facilitating the use of a relatively small (and cost-effective) component. This approach is useful, for example, for LIN systems in which the battery voltage is limited between 7 and 18V.

In certain embodiments, the switch 210 is implemented with a single MOS transistor 212 having its gate connected to the switch driver 220, and its source and drain respectively connected in series on a bus between first and second bus nodes as may be implemented, for example, with bus 112 of FIG. 1. When in an open state, the transistor 212 cuts off current in a single direction for blocking current from passing along the bus to an adjacent (or further) nodes. Accordingly, when the gate source voltage of the transistor 212 exceeds the threshold, the switch conducts and passes a signal through the transistor and along the bus. The driver 220 is configured and arranged so that the gate-source voltage of the transistor 212 stays present when the bus voltage exceeds a supply voltage range (e.g., 0-12V). When the gate and source of the transistor 212 are shorted or below the threshold voltage, the switch will not conduct anymore and prevents the passing of a signal through the transistor.

Figure 3:
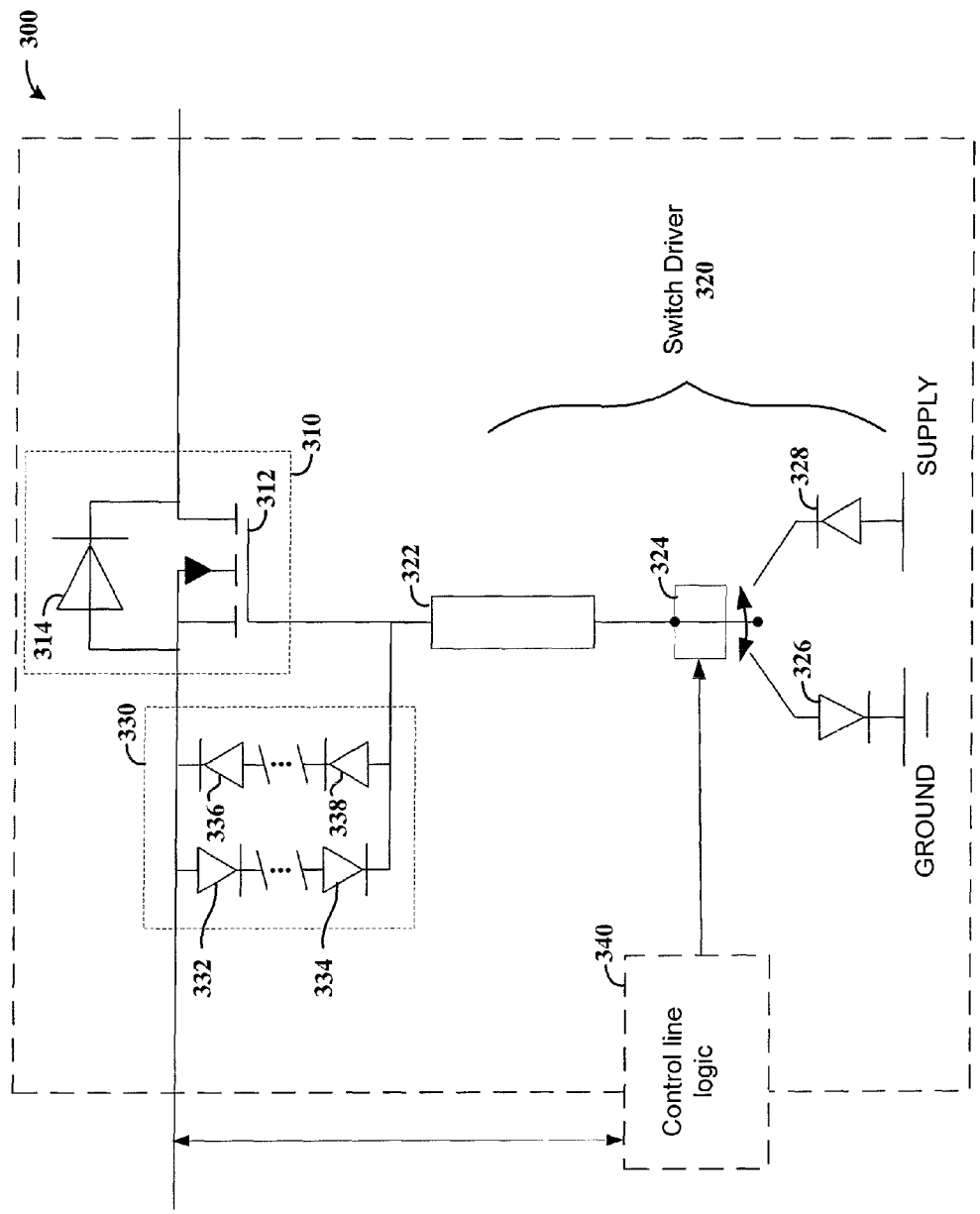
FIG. 3 shows another network switching circuit, in accordance with another example embodiment of the present invention.

FIG. 3 shows another network switching circuit 300, in accordance with another example embodiment of the present invention. The switching circuit 300 includes a switch circuit 310, a driver circuit 320, and an impedance circuit 330. The switch 310 includes a transistor 312 with an integrated diode 314 (by nature), with the source and drain of the transistor respectively coupled in series to network bus nodes, and the gate of the transistor connected to the driver circuit 320. The driver circuit 320 is responsive to control line logic 340, which may, for example, include a transceiver, microcontroller and/or other circuitry for providing control signals for operating the driver circuit.

The driver circuit 320 includes a resistor 322 connected between a switch 324 and the gate of the transistor 312. The switch 324 operates to selectively connect the resistor 322 to each of ground and a supply voltage, respectively via diodes 326 and 328. The resistor is also connected between the switch 324 and the impedance circuit 330 and, therein, to the network node to which the source of the transistor 312 is connected.

The impedance circuit 330 includes two sets of diodes in an anti-parallel arrangement, shown here by way of example with diodes 332 and 334 with the understanding that additional diodes may be used. The diodes 332 and 334 are connected in series with one another and in anti-parallel with diodes 336 and 338, with diodes 336 and 338 also coupled in series with one another. Accordingly, diodes 332 and 334 flow current of a polarity that is opposite the polarity of the current that diodes 336 and 338 flow, with the polarity of the current being controlled by the switch 324 and its connection to either ground via diode 326, or a supply voltage via diode 328.

In order to turn on the switch 310, a voltage has be applied across the gate and source of the switch. Because the source is not connected to a voltage supply, it is not enough to just apply a voltage in a conventional way between gate and supply. Accordingly, the on-state or off-state of the switch 310 is made by applying a positive or a negative bias-current through the impedance circuit 330. The bias-current is determined by the resistor 322, and the polarity of the current is determined by the switch 324 that connects the resistor between the gate and ground via diode 326, or between the gate and supply via diode 328.

If the LIN-bus voltage provided at the switch 310 is higher than the battery-voltage (e.g., due to EMI), the bias-current reduces to 0 but the diodes in the impedance circuit 330 maintain the voltage across the gate-source of the transistor 312 for a short amount of time.

Using approaches as shown in FIG. 3, with circuits as described herein and/or shown in the other figures, bus communications and related switching can be effected while in the presence of a noisy environment. For instance, by controlling the switch 310 using an impedance-based polarity approach as shown, the switch position can be set in a manner that is generally independent from noise.

Figure 4A:
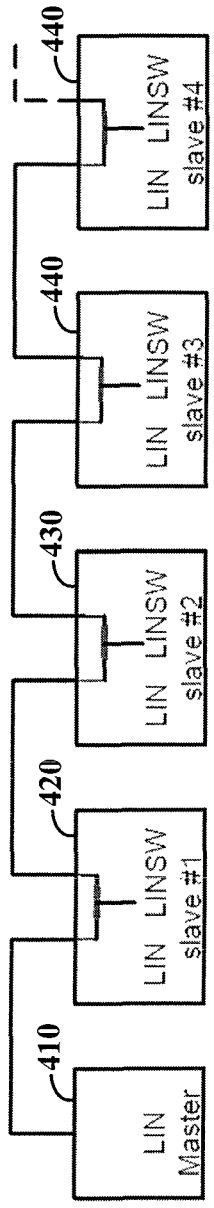
FIGS. 4A-4D show a network system in various states of operation, in accordance with another example embodiment of the present invention.

FIGS. 4A-4D show a network system in various states of operation, in accordance with another example embodiment. Referring to FIG. 4A, a LIN master circuit 410 is shown coupled to several LIN slave circuits 420, 430, 440 and 450, in a cascaded arrangement. Each slave circuit includes a switch in accordance with one or more switches as discussed herein, such as shown in and described in connection with one or more of FIGS. 1-3. As shown in FIG. 4A, the switches in the slave circuits are normally closed (conducting), such that all of the slave circuits receive messages from the master.

Figure 4B:
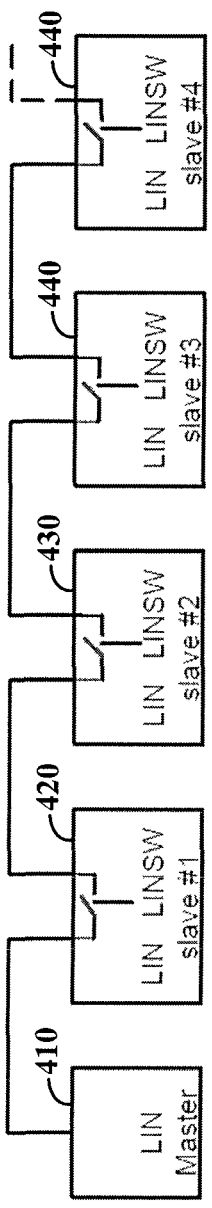

At FIG. 4B, the master circuit 410 has sent a command to the slave circuits for entering a configuration mode, and each of the slave circuits has opened its respective switch in response to this mode. In this regard, the slave circuit 420 is coupled to receive communications from the master 410, but blocks any communications from the master from passing to the other slave circuits 430, 440 and 450. The master circuit 410 communicates an address assignment message, which is received only by the slave circuit 420, which stores address information according to the message.

Figure 4C:
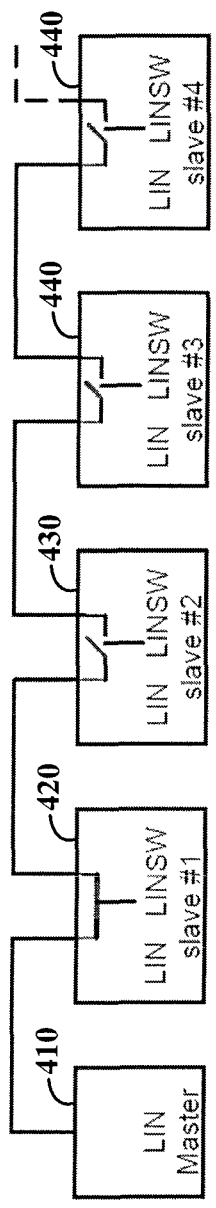
Figure 4D:
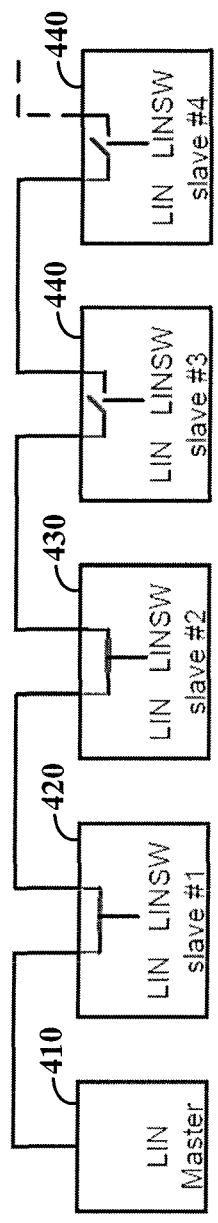

At FIG. 4C, the slave circuit 420 closes its switch as it has now been configured with an address, coupling the master circuit 410 to pass signals on the bus beyond the slave circuit 420. The slave circuit 430 is now in position to receive subsequent messages from the master circuit 410, which sends another address assignment message. The slave circuit 420 does not process (e.g., ignores) this other address assignment message as it has already been assigned an address, and slave circuit 430 responds to the address assignment message by storing address information according to the message, and closing its switch as shown in FIG. 4D.

This process as shown in FIGS. 4A-4D continues for subsequent slave circuits, until all slave circuits have been addressed. In addition, if a new slave circuit is added to the bus as shown, the master circuit 410 can send a new configuration signal to cause the new slave circuit to open its switch. In some implementations, the address assignment process is carried out again from the beginning when a new slave circuit is added to the bus as shown. In other implementations, if the slave circuits 420, 430, 440 and 450 have already been configured with an address, these circuits maintain their switches in the closed position. As any such new circuit that has not been addressed would open its switch in response to the configuration signal, this new circuit then subsequently receives an address assignment message from the master circuit 410. Accordingly, if more than one new slave circuit is added, the respective slave circuits are subsequently addressed using approaches as discussed above, either starting again from the beginning or entering a configuration mode in which only new slave circuits are assigned addresses. Moreover, this approach can be realized in the context of replacing existing slave circuit nodes, such that all slave nodes (e.g., using a different protocol) can be replaced in a system, and the new nodes can be assigned an address as they are added.

Address assignment as discussed above in connection with FIGS. 4A-4D can be carried out at a manufacturing facility as which the master and slave circuits are manufactured for sale as a system, at a manufacturing facility upon installation of the master and slave circuits, or in the field to replace some or all slave circuits in a system. Moreover, this approach can be carried out with slave circuits that are identical (or nearly identical) while also facilitating separate addressing. In various embodiments, method-based aspects of the functions as described in connection with FIGS. 4A-4D are implemented as an algorithm that is executed at the master and slave circuits, for carrying out the respective steps for communicating and addressing slave circuits.

Figure 5:
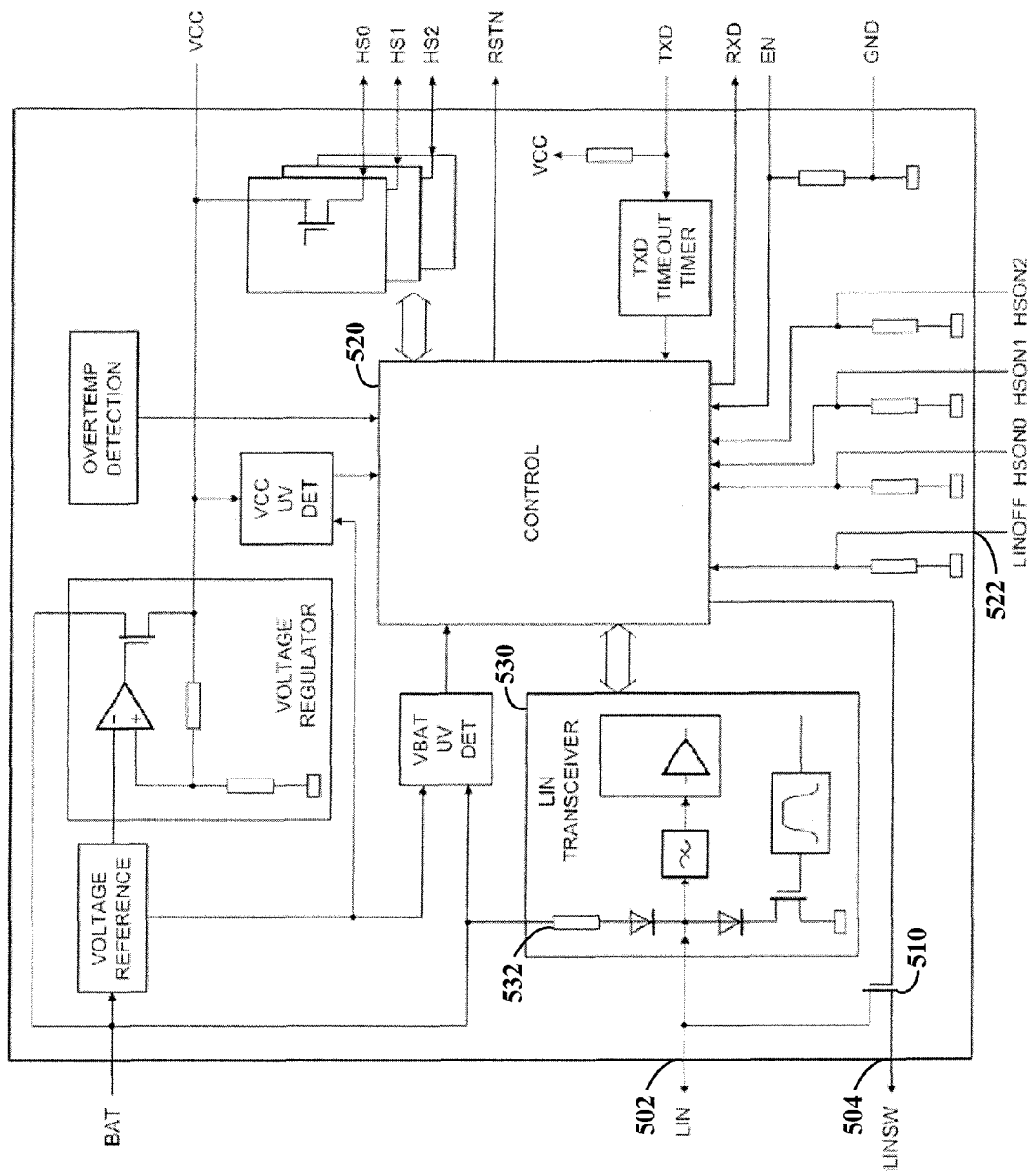
FIG. 5 shows a slave circuit, in accordance with another example embodiment of the present invention.
Figure 6:
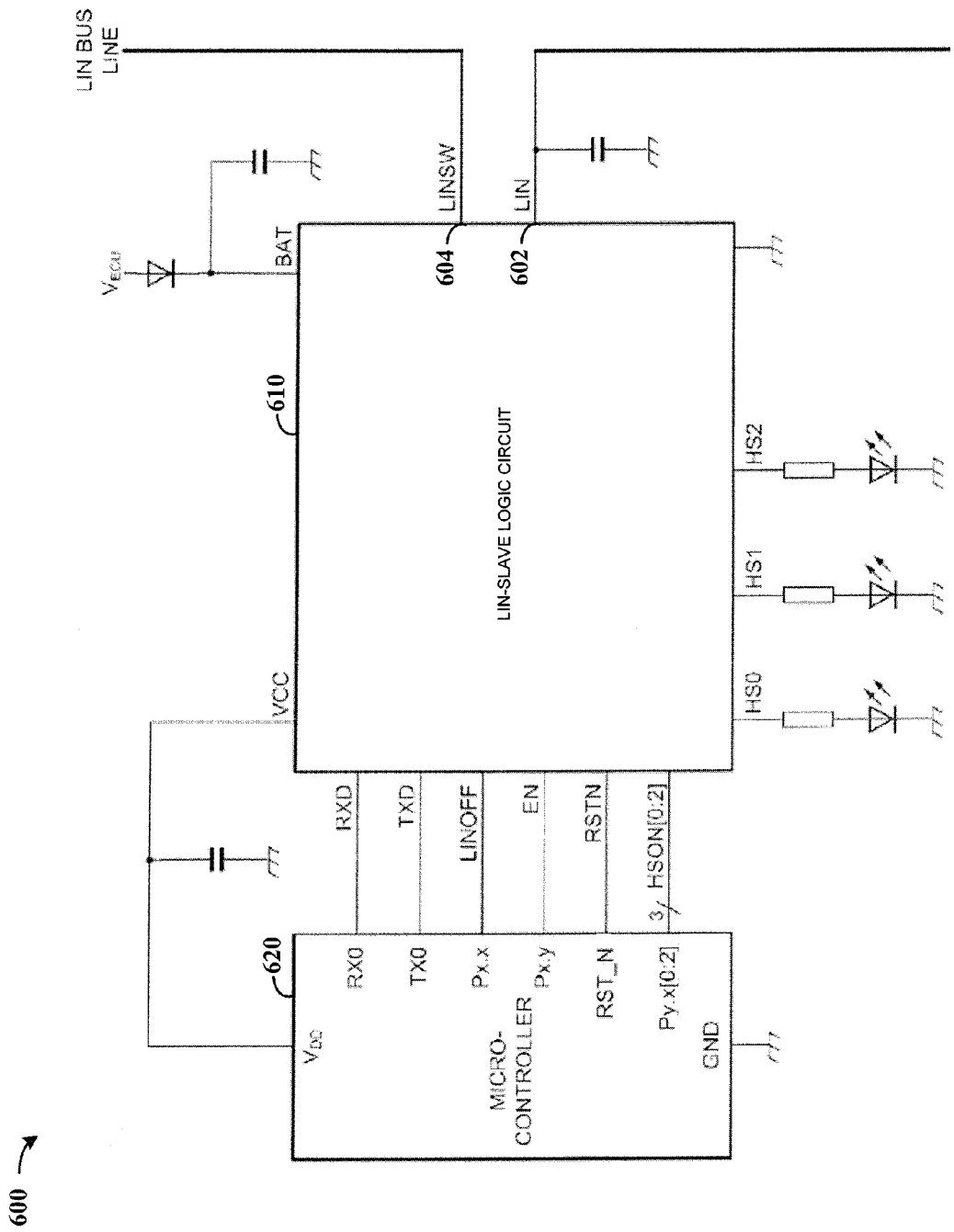
FIG. 6 shows a circuit for use in a slave circuit, in accordance with another example embodiment of the present invention.

FIG. 5 shows a slave circuit 500, in accordance with another example embodiment, exemplifying an example application of one or more switching circuits and/or methods as described herein. The slave circuit 500 includes a switch 510 and a controller 520, that operate in response to signals received from a master circuit on a bus at node 502 and passed by transceiver 530, to either pass or block signals on the bus from passing along the bus between node 502 and node 504. This operation may, for example, be made in conjunction with a microcontroller as shown in FIG. 6, with the controller 520 being responsive to inputs from the microcontroller. A termination resistor 532 in transceiver 530 facilitates termination functions, in accordance with various embodiments, as may be implemented as discussed otherwise herein for operation of the transceiver and/or the slave circuit 500. The slave circuit 500 may be operated using, for example, circuits and/or approaches as described herein, and as shown in FIGS. 1-4. For instance, when a configuration signal is received from a master at node 502, the transceiver 530 communicates this signal to the controller 520 which operates to open the switch 510 based on a LINOFF signal at 522 (e.g., received from a microcontroller as discussed above), thus blocking further signals from the master from passing to additional slave circuits via node 504. When an address configuration signal is received at node 502, the controller 520 uses the signal to configure the slave circuit 500 with an address, then closes the switch 510 to pass subsequent signals from the master circuit along the bus (e.g., for assigning an address to other slave circuits).

FIG. 6 shows a circuit 600 for use in a slave circuit, in accordance with another example embodiment of the present invention. A switching circuit 610 is connected to a bus at pins 602 and 604, and a microcontroller 620 controls the switching circuit. The switching circuit 610 may, for example, be implemented using a circuit such as the slave circuit 500 shown in and described in connection with FIG. 5, and coupled via bus nodes 502 and 504. In such an implementation, the microcontroller 620 is responsive to messages received via a transceiver (e.g., such as transceiver 530, with the slave circuit 500 implemented with the switching circuit 610), by controlling a LINOFF signal to open a switch in the slave circuit in response to a configuration signal received form a master circuit. Further, the microcontroller 620 is operative to receive and store addressing information, in a configuration mode in which the LIN switch is opened, and to subsequently close the LIN switch to permit master communications to pass to subsequent slave circuits on the bus.

As a non-limiting example application of one of many ways to implement the above-discussed technology, for the following discussion reference may be made to the slave circuit 500 and/or switching circuit 610 of FIGS. 5 and 6, respectively. Implementing such circuits as an integrated circuit (IC) chip (e.g., switching circuit 610 as chip 610), the chip 610 combines the functionality of a LIN transceiver and a voltage regulator in a single IC chip (with pins for accessing internal circuitry not shown). As is common for IC chips, the voltage regulator is designed to power the Unit's microcontroller and its peripherals. The chip 610 provides an interface between a LIN master/slave protocol controller and the physical bus in a Local Interconnect Network ("LIN" which may be designed for LIN 2.0/2.1/SAE J2602 compliance and for ElectroMagnetic Compatibility (EMC) performance by wave shaping the LIN output).

In addition the chip 610 can support LIN node address assignment in daisy chain networks via a LIN bus switch. This enables off-the-shelf uses of more than one equal ECU's in the same network without the need to pre-configure LIN node addresses per ECU. For applications like LED ambient lighting, the chip 610 can provide multiple (e.g., 3) integrated high-side switches. Such switches can be designed to drive up to 30 mA, or as applications might otherwise require. In more detailed implementations, the chip 610 can run at a speed of 20 kBd, which is the maximum specified in the LIN standard and, as specified in SAE J2602, the chip 610 can run at a transmission speed of 10.4 kBd.

For these detailed implementations, the chip 610 can support numerous operating modes. In accordance with one such implementation, the chip 610 supports four operating modes: Normal, Standby, Sleep and Off as explained in connection with the following examples. In the Off mode, the chip 610 switches to Off mode from all other modes if the battery supply voltage drops below the power-off detection threshold or the juncture temperature exceeds the over-temperature protection activation threshold. The voltage regulator and much of the LIN-directed functionality (e.g., corresponding to a LIN physical layer) are disabled in Off mode, and pin RSTN is forced LOW. Standby mode is a conventional low power mode for operating at a current consumption rate that is much lower than the current consumption rate(s), for example, associated with the Normal mode. The chip 610 switches from Off mode to Standby mode as soon as the battery supply voltage rises above a power-on detection threshold, provided that other conventional circuit-implemented conditions permit (e.g., the junction temperature is below the over-temperature protection release threshold). The chip 610 switches from Standby mode to Normal mode during the mode select window if TXD is HIGH and EN is LOW, provided RSTN=1 (as shown in both FIGS. 5 and 6). Also a remote wake-up event can be implemented in the chip to trigger a transition to Standby mode from Sleep mode (e.g., the remote wake-up event can be signaled by a continuous LOW level on pin RXD). In Standby mode, the voltage regulator is on, the LIN-directed functionality (e.g., LIN physical layer) is disabled and remote wake-up detection is active. The wake-up source is indicated by the level on RXD (LOW indicates a remote wake-up).

In Normal mode, if the EN pin is pulled HIGH while the chip 610 is in Standby mode (with RSTN=1) or Sleep mode, the internal logic circuitry can be configured to enter Normal mode. The LIN-directed functionality (e.g., LIN physical layer) and the voltage regulator are enabled in Normal mode. The LIN transreceiver is activated when the chip 610 enters Normal mode, and this permits the transreceiver to transmit and receive data via the LIN bus. The receiver detects data streams on the LIN pin and transfers them to the microcontroller via pin RXD. LIN recessive is represented by a HIGH level on RXD, LIN dominant by a LOW level. The transmit data streams of the protocol controller at the TDX input are converted by the transmitter into bus signals with optimized slew rate and wave shaping to minimize EME. A LOW level at the TDX input is converted to a LIN dominant level while a HIGH level is converted to a LIN recessive level.

In Sleep mode, the chip 610 features extremely low power consumption (lower than Standby mode). The chip 610 can switch to Sleep mode from Normal mode during the mode select window if TDX and EN are both LOW, provided RSTN=1. The voltage regulator and the LIN-directed functionality (e.g., LIN physical layer) are disabled in Sleep mode. Pin RSTN is forced LOW. Remote wake-up detection is active.

In transition from Normal to Sleep or Standby mode, when EN is driven LOW in Normal mode, the chip 610 disables the transmit path. The mode select window opens (for a minimum brief period) after EN goes LOW and remains open (until and setting an outer maximum for the window) after EN goes LOW. The TDX pin is sampled in the mode select window. A transition to Standby mode is triggered if TDX is high, or to Sleep mode if TDX is LOW. To avoid complicated timing in the application, EN and TDX can be pulled LOW at the same time without having any effect on the LIN bus. In order to ensure that the remote wake-up time is not reset on a transition to Sleep mode, TDX should be pulled low for a brief time after EN goes LOW. The user/application ensures that the appropriate level is present on pin TDX while the mode select window is open.

As is conventional, the chip 610 contains a single supply pin, $V_{BAT}$, with an external diode in series to protect the device against negative voltages. For example, the operating range can be from 4.5 V to 28 V, and the chip 610 can be designed to handle voltages up to 40 V (maximum). If the voltage on pin $V_{BAT}$ falls below a cut-off threshold, the chip 610 switches to Off mode, shutting down the internal logic and the voltage regulator and disabling the LIN transmitter. The chip 610 exits Off mode as soon as the voltage rises above an operational threshold, provided that other conditions (e.g., the junction temperature) are adequate. The output voltage on pin Vcc can be monitored continuously and a system reset signal can be generated (pin RSTN goes LOW) if an undervoltage event is detected.

As mentioned above, the LIN transceiver provides the interface between a LIN master/slave protocol controller and the physical bus in a LIN network. The LIN transceiver can be used for in-vehicle sub-networks, for example, using baud rates from 2.4 kBd up to 20 kBd and can be readily adapted for compliance with LIN 2.0/LIN 2.1/SAE J2602.

A remote wake-up can be triggered by a falling edge on pin LIN, followed by LIN remaining LOW for at least a brief window, followed by a rising edge on pin LIN. The remote wake-up request is communicated to the microcontroller in Standby mode by a continuous LOW level on pin RXD. Note that this brief window can be measured in Sleep and Standby modes, and in Normal mode if TDX is High.

The LIN switch is controlled via input pin LINOFF. It passes the LIN bus signal from LIN to pin LINSW and vice versa, if LINOFF is LOW. The LIN bus signal from pin LIN to LINSW is interrupted if LINOFF is HIGH. The pull-down resistor on pin LINOFF provides a defined input level, where the LIN bus signal is passed between pin LIN and pin LINSW. If RSTN is LOW, the input level on pin LINOFF is ignored. The internal default input state is LOW.

The high-side switches on the pins HS0, HS1 and HS are controlled via the input pins HSON0, HSON1 and HSON2, respectively. A high-side switch is ON if the corresponding control input pin HSONx is HIGH. The pull-down resistor on the pins HSON0, HSON1 and HSON2 provides a defined input level, where high-side switches are OFF. If RSTN is LOW, the input level on the pins HSON0, HSON1 and HSON2 are ignored. The internal default input state is LOW.

The chip 610 can be implemented with the following fail-safe features. First, an internal pull-up resistor towards VCC on pin TDX guarantees a recessive bus level if the pin is left floating by a bad solder joint or floating microcontroller port pin. The current in the transmit output stage can be limited to protect the transmitter against short circuits to pin VBAT. A loss of power (e.g., via pins VBAT and GND) should have no impact on the bus line or on the microcontroller, and there will be no reverse currents from the bus. Also, the LIN transmitter can be implemented so that it is automatically disabled when either EN or RSTN is LOW. After a transition to Normal mode, the LIN transmitter can be enabled only if a recessive level is present on pin TDX.

The chip 610 can also include logic/timer circuitry for providing a TDX dominant time-out function. For example, a TDX dominant time-out timer circuit prevents the bus line being driven to a permanent dominant state (blocking network communications) if TDX is forced permanently LOW by a hardware or software application failure. The timer in the timer circuit is triggered by a negative edge on the TDX pin. If the pin remains LOW for longer than the TDX dominant time-out time, the transmitter is disabled, driving the bus line to a recessive state. The timer is reset by a positive edge on TDX.

The temperature of the chip 610 can be monitored in Normal, Standby and Off modes. If the temperature is too high (over a preset threshold), the chip 610 will switch to Off mode (if in Standby or Normal modes). The voltage regulator and the LIN transmitter will be switched off and the RSTN pin driven LOW. When the temperature falls below an overtemperature protection release threshold, the chip 610 switches to Standby mode.

The various controllers, logic circuits and control methods described herein can be implemented using a variety of devices and methods. For example, logic or processing circuits can be implemented using one or more of: discrete logic circuitry, fully-programmable and semi-programmable circuits such as PLAs (programmable logic arrays), specialized processors or general purpose processors that are specially programmed. Combinations of these and other circuit components are also possible and within the scope of various embodiments, including those discussed above. For example, the logic and switch driver 220 and microcontroller 240 in FIG. 2 can be implemented in a variety of circuit-based forms, such as through the use of data processing circuit modules. Other controllers and logic circuits as shown in FIGS. 3, 5 and 6 may be similarly implemented. Such systems are exemplified by implementation in high-speed programmable computer/processor circuits, or in combination with discrete and or semi-programmable circuitry (e.g., as Field-Programmable Gate Arrays, Programmable Logic Devices/Arrays).

Based upon the above discussion and illustrations, those skilled in the art will readily recognize that various modifications and changes may be made to the present invention without strictly following the exemplary embodiments and applications illustrated and described herein. For example, switches as discussed herein in connection with a particular type of network (e.g., the LIN) can be implemented with other networks, such as for automotive and/or industrial applications. In addition, the switch-type functions and related circuits (such as voltage sources) as discussed herein may be implemented in connection with various slave circuits and bus systems, such as shown and described in connection with U.S. Pat. No. 7,937,516 assigned to NXP B. V. of Eindhoven, Netherlands. Furthermore, various embodiments described separately, whether above, shown in the figures or in the attached Appendix, may be implemented together or using aspects therein. Such modifications do not depart from the true spirit and scope of the present invention, including that set forth in the following claims. Furthermore, the term "example" as used throughout this document is by way of illustration, and not limitation.

What is claimed is:

1. An apparatus comprising a master circuit and a plurality of slave circuits communicatively coupled in a cascaded arrangement via a current-carrying bus, each of the slave circuits including circuitry having a switch that includes a transistor having current passing terminals and that is configured and arranged to, in response to a control signal received over the bus, interrupt and thereby block current and data conveyed on the current-carrying bus from passing to another one of the slave circuits that is immediately adjacent in the cascaded arrangement, wherein the circuitry is configured and arranged to control the current through the terminals based on a bias signal operating in the circuitry and affecting a current passing operation of the transistor, wherein the switch includes a gate and a source and an impedance circuit is connected between the gate and the source.

2. The apparatus of claim 1, wherein each of the slave circuits is configured and arranged to, in response to receiving an address assignment signal from the master circuit, store address information and close the switch to pass current from the master circuit to another one of the slave circuits.

3. The apparatus of claim 2, wherein the master circuit is configured and arranged to send the control signal and, after sending the control signal, to send successive address assignment signals for assigning an address to successive ones of the slave circuits, each slave circuit respectively configured and arranged to respond to the address assignment signals by, after storing address information and closing the switch in response to a first-received one of the address assignment signals, ignoring subsequent address-assignment signals.

4. The apparatus of claim 3, wherein the slave circuit includes a microcontroller configured and arranged to respond to the address assignment signals by, after storing the address information, generating a signal to close the switch in response to a first-received one of the address assignment signals, and ignoring subsequent address-assignment signals.

5. The apparatus of claim 2, wherein the slave circuits are configured and arranged to, in response to receiving the address assignment signal for which the address information is stored, communicate an acknowledgement signal to the master circuit, the master circuit being configured and arranged to respond to the acknowledgement signal by communicating another address assignment signal on the bus for another one of the slave circuits on the bus.

6. An apparatus comprising:
  circuitry having a switch with terminals including a gate and a source and a drain;
  a control circuit connected to the gate and configured and arranged to apply a bias to the gate to control a conductance state of the switch by, in response to a control signal presented at the source,
    in a first mode, controlling the switch in an open state to block signals from passing through the switch, and in a second mode, controlling the switch in a closed state to pass signals through the switch; and a logic circuit configured and arranged to respond to address information received in a signal presented at the source by, in the first mode, storing the address information to configure the apparatus with the address and, in the second mode, ignoring address information in signals presented at the source, wherein the circuitry is configured and arranged to control the current through the terminals based on a bias signal operating in the circuitry and affecting a current passing operation of the switch, wherein an impedance circuit is connected between the gate and the source.

7. The apparatus of claim 6, further including a microcontroller configured and arranged to respond to a configuration signal received at the switch by generating and providing the control signal, the control circuit being configured and arranged to control the switch in the open state or the closed state based on the control signal generated by the microcontroller.

8. The apparatus of claim 7, wherein the microcontroller includes the logic circuit.

9. The apparatus of claim 7, wherein the apparatus is part of an addressable slave circuit, and the microcontroller is configured and arranged to generate and provide the control signal to
operate the switch in the first mode to assign an address to the slave circuit,
operate the switch in the second mode after an address has been assigned to the slave circuit, and
operate the switch in the first mode to re-assign an address to the slave circuit, after an address has been assigned to the slave circuit, the logic circuit being responsive to new address information received at the switch by storing the new address information for the slave circuit.

10. The apparatus of claim 7, wherein the microcontroller is configured and arranged to respond to the control signal in the first mode by, in response to receiving address data, switching the control circuit to the second mode.

11. The apparatus of claim 7, wherein the microcontroller is configured and arranged to
operate the control circuit in the first mode until address data is received via a communications bus coupled to the switch, and
in response to receiving the address data, use the address data to identify communications on the bus as being communications for the microcontroller, and switching to the second mode.

12. An apparatus comprising:
a switch having a gate, a source and a drain;
a control circuit connected to the gate and configured and arranged to apply a bias to the gate to control a conductance state of the switch by, in response to a control signal presented at the source,
in a first mode, controlling the switch in an open state to block signals from passing through the switch, and
in a second mode, controlling the switch in a closed state to pass signals through the switch;
a logic circuit configured and arranged to respond to address information received in a signal presented at the source by, in the first mode, storing the address information to configure the apparatus with the address and, in the second mode, ignoring address information in signals presented at the source; and an impedance circuit connected between the gate and the source, wherein the control circuit is connected to the gate and the impedance circuit, and the control circuit is configured and arranged to
control the switch in the open state by flowing a bias current of a first polarity through the impedance circuit, and
control the switch in the closed state by flowing a bias current of opposite polarity through the impedance circuit.

13. The apparatus of claim 12 wherein the control circuit includes a switch and a resistor connected between the switch and the gate, the switch being configured and arranged to connect the resistor to a ground node for flowing the bias current at a first polarity, and to connect the resistor to a voltage supply to flowing the bias current at a second polarity that is opposite the first polarity.

14. The apparatus of claim 12, wherein the impedance circuit includes two sets of diodes arranged in anti-parallel between the gate and source.

15. The apparatus of claim 12, wherein the impedance circuit includes two sets of diodes respectively configured and arranged to pass current in opposite directions between the gate and source.

16. A communication apparatus comprising:
a master circuit that includes a transistor having current passing terminals, at a master node, configured and arranged to communicate a configuration signal and an address signal on a communications bus; and
a plurality of slave circuits at slave nodes on the bus, each slave circuit having a switch that couples the slave circuit to an immediately adjacent slave circuit on the bus, and each slave circuit being configured and arranged to respond to the configuration signal by,
in a first mode, controlling the switch in an open state to block the address signal from passing to the immediately adjacent slave circuit on the bus, storing address information from the address signal, and switching to a second mode after storing the address information, and
in the second mode, controlling the switch in a closed state to pass the address signal to the immediately adjacent slave circuit on the bus, wherein the circuitry is configured and arranged to control the current through the terminals based on a bias signal operating in the circuitry and affecting a current passing operation of the transistor, wherein the switch includes a gate and a source and an impedance circuit connected between the gate and the source.

17. The communication apparatus of claim 16, wherein
the slave circuits are configured and arranged to, in response to storing the address information, communicate an acknowledgement signal to the master circuit, and
the master circuit is configured and arranged to respond to the acknowledgement signal by communicating another address signal on the bus for another one of the slave circuits on the bus.

18. A method for assigning addresses to a plurality of slave circuits connected to each other and to a master circuit in a cascaded arrangement on a bus that includes a transistor having current passing terminals, the method comprising:
communicating, from the master circuit, a first signal;
at each slave circuit receiving the first signal, opening a switch to block further communications from passing from the master circuit, through the slave circuit and to another immediately adjacent slave circuit on the bus;

communicating, from the master circuit, a second signal including address assignment data; and at one of the slave circuits, in response to receiving the address assignment data, storing data indicative of an address in the address assignment data, and closing a switch to pass communications from the master circuit to an immediately adjacent slave circuit on the bus, wherein the circuitry is configured and arranged to control the current through the terminals based on a bias signal operating in the circuitry and affecting a current passing operation of the transistor, wherein the switch includes a gate and a source and an impedance circuit connected between the gate and the source.

19. The method of claim 18, further including communicating, from the master circuit, a third signal including address assignment data for another one of the slave circuits, and at the other one of the slave circuits, in response to receiving the address assignment data in the third signal, storing data indicative of an address in the address assignment data, and closing a switch to pass communications from the master circuit to an immediately adjacent slave circuit on the bus.

20. The method of claim 18, wherein opening a switch and closing a switch respectively include operating a microcontroller to generate control signals to control the switch to respectively operate in an open state and in a closed state, and wherein storing data includes operating the microcontroller to process the address assignment data and store address assignment information therein.

* * * * *